United States Patent
Grossmann et al.

(10) Patent No.: US 9,746,898 B2
(45) Date of Patent: Aug. 29, 2017

(54) SYSTEMS AND METHODS FOR CONTROLLING PROCESSING DEVICE POWER CONSUMPTION

(71) Applicants: Philip J. Grossmann, Austin, TX (US); Joseph A. Olmsted, Cedar Park, TX (US)

(72) Inventors: Philip J. Grossmann, Austin, TX (US); Joseph A. Olmsted, Cedar Park, TX (US)

(73) Assignee: Dell Products LP, Round Rock, TX (US)

( * ) Notice: Subject to any disclaimer, the term of this patent is extended or adjusted under 35 U.S.C. 154(b) by 23 days.

(21) Appl. No.: 14/836,618

(22) Filed: Aug. 26, 2015

(65) Prior Publication Data
US 2017/0060220 A1   Mar. 2, 2017

(51) Int. Cl.
G06F 1/32   (2006.01)
G06F 1/20   (2006.01)

(52) U.S. Cl.
CPC ............ *G06F 1/3206* (2013.01); *G06F 1/206* (2013.01); *G06F 1/3296* (2013.01)

(58) Field of Classification Search
None
See application file for complete search history.

(56) References Cited

U.S. PATENT DOCUMENTS

| | | | |
|---|---|---|---|
| 2004/0148528 A1* | 7/2004 | Silvester | G06F 1/206 713/300 |
| 2006/0136076 A1* | 6/2006 | Rotem | G05D 23/20 700/44 |
| 2009/0099807 A1* | 4/2009 | Therien | G06F 1/206 702/132 |
| 2012/0066535 A1* | 3/2012 | Naffziger | G06F 1/206 713/340 |
| 2014/0281618 A1 | 9/2014 | Sultenfuss et al. | |

OTHER PUBLICATIONS

Wikipedia, "Thermal Design Power", Printed from Internet Aug. 19, 2015, 5 pgs.
Rotem et al., "Power Management Architecture of the $2^{nd}$ Generation Intel Core Microarchitecture, Formerly Codenamed Sandy Bridge", Hot Chips, Aug. 2011, 33 pgs.
Sierra et al., "Systems and Methods for Orchestrating External Graphics", DELL:186; U.S. Appl. No. 14/523,547, filed Oct. 24, 2014, 67 pgs.

* cited by examiner

*Primary Examiner* — Paul Yanchus, III
(74) *Attorney, Agent, or Firm* — Egan, Peterman, Enders & Huston LLP.

(57) ABSTRACT

Systems and methods that may be implemented to decrease power consumption levels of a first processing device (e.g., such as a CPU) based on monitored operating temperature of a second and different processing device (e.g., such as a discrete GPU) in a shared multiple-processor cooling resource environment of an information handling system architecture. The first processing device power consumption levels may be so controlled such that the operating temperature of the second processing device does not reach a temperature at which the second processing device is throttled.

20 Claims, 2 Drawing Sheets

SYSTEMS AND METHODS FOR CONTROLLING PROCESSING DEVICE POWER CONSUMPTION

FIELD OF THE INVENTION

This application relates to processing device power consumption and, more particularly, to controlling processing device power consumption for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Notebook computers include a host central processing unit (CPU) to perform processing tasks for the system including executing various applications such as computer games. A notebook computer may also include internal graphics processing unit (GPUs) in the form of a lower performance internal integrated GPU (iGPU), and a higher performance internal discrete GPU (dGPU). The internal iGPU is integrated within the host central processing unit (CPU) inside the notebook computer chassis enclosure, and the internal discrete GPU is provided inside the enclosure of a notebook computer chassis and coupled to the host CPU using an internal data bus. The host CPU and dGPU typically share the same notebook heat sink and fan cooling resources that are located within the same notebook computer chassis. In an effort to shrink form factors, such a shared cooling configuration has allowed original equipment manufacturers (OEMs) to ship notebook computer systems that have a combined shared cooling resource capacity that is lower than the sum of the cooling requirements of the individual processor parts that share the same cooling resources. This allows for provision of a smaller cooler system with lower thermal density.

Some notebook computer CPUs are configured to operate at multiple configurable power levels by controlling processor clock speed. These power levels include a power level 1 (OEM PL1) that specifies maximum processor power power consumption that the CPU can run under a sustained processing load, and a power level 2 (OEM PL2) that specifies a higher maximum processor power consumption that a CPU can run for a short period of time to handle higher processing loads. Selection of CPU power levels are often made based on a thermal design power (TDP) design value that is specified for the CPU that represents the maximum amount of heat generated by the CPU that the cooling system of a notebook computer is required to dissipate during operation. During computer game play operation, a notebook CPU will typically draw at least a minimum amount of power set by the PL1 value specified for the notebook CPU, regardless of the processing complexity of the current computer game, i.e., remaining at this minimum power consumption level regardless of game complexity (from simple Indie game titles to AAA game titles).

SUMMARY OF THE INVENTION

Systems and methods are disclosed herein that may be implemented to reduce processing device power consumption levels based on monitored processing device temperatures in a shared multiple-processing device cooling environment of an information handling system architecture, e.g., such as a dual processing device information handling system architecture having a CPU and separate dGPU that share the same cooling resources (heat sink/s, cooling fan/s, etc.) and that are located in the same information handling system chassis enclosure. In one exemplary embodiment, CPU power consumption levels may be controlled (e.g., decreased or throttled) based on the monitored non-throttled operating temperature of a second and different processing device (e.g., such as a dGPU) that is co-located within the same chassis enclosure and that shares the same cooling resources as the CPU such that the operating temperature of the dGPU does not reach a temperature at which the dGPU is throttled.

In a further exemplary embodiment, CPU power consumption levels may be reduced in a manner that reduces heat generation of the CPU to allow increased dGPU performance while at the same time maintaining at least the same processing performance for a given application executing on the CPU and dGPU, e.g., such as maintaining at least the identical frames per second (FPS) of a given computer game application at a lower CPU power consumption level as was experienced when the CPU was operating at a higher power consumption level. Thus, the disclosed systems and methods may be implemented in one embodiment to reduce CPU power consumption and increase dGPU performance while providing little or no detriment to PC Gaming performance (as measured by both synthetic and in-game benchmarks and monitoring in-game frames per second or FPS). Advantageously, the disclosed systems and methods may be so implemented in one exemplary embodiment to continue to provide CPU & dGPU performance at the highest levels, but with the advantage of also providing longer battery life than is possible with the same CPU and dGPU operating in a conventional manner without the disclosed systems and methods.

In another exemplary embodiment, the disclosed systems and methods may be implemented in a shared CPU/dGPU cooling system architecture as an iterative CPU throttling mechanism to limit running average power of a CPU incrementally until a non-throttled dGPU cools to a temperature range that is greater than a selected amount below the rated maximum non-throttled temperature of the dGPU such that the dGPU continues to operate in a non-throttled state. The disclosed systems and methods may be further implemented to continue to monitor operating temperature of the dGPU until a margin of dGPU rated non-throttled maximum temperature exceeds a selected amount below the rated maximum non-throttled temperature of the dGPU, at which point running average power of the CPU may be increased incrementally until returning to a higher CPU power consumption level such as an originally specified CPU OEM PL1 (e.g., OEM PL1) value specified by the CPU manufacturer. In one embodiment, the disclosed systems and methods may be so implemented to avoid allowing operating temperature of the dGPU to increase to a temperature above the dGPU rated non-throttled maximum temperature in order to prevent the dGPU 120 from ever entering a throttled state. In a further embodiment, the disclosed systems and methods may be so implemented to operate the CPU without a fixed PL1 value and/or without limit to a specific dGPU temperature range. The disclosed systems and methods may be advantageously implemented in system architectures running either overclocked CPU or non-overclocked CPU modes.

In one respect, disclosed herein is a method of controlling processing device power consumption in an information handling system having multiple processing devices, the method including: simultaneously operating at least one first processing device and at least one second processing device of the information handling system while simultaneously cooling the first and second processing devices together using shared cooling resources of the information handling system, and with the first processing device being operated at a maximum allowable power limit value; and then using at least one processing device of the information handling system to decrease the maximum allowable power limit value of the first processing device if a monitored real time operating temperature of the second processing device is greater than or equal to a predefined upper temperature value.

In another respect, disclosed herein is an information handling system, including: at least one first processing device and at least one second processing device, the first processing device being configured to operate at a maximum allowable power limit value; shared cooling resources configured to simultaneously cool the first and second processing devices together; and at least one processing device communicatively coupled to the first and second processing devices that is configured to: monitor real time operating temperature of the second processing device, and decrease the maximum allowable power limit value of the first processing device if a monitored real time operating temperature of the second processing device is greater than or equal to a predefined upper temperature value.

DESCRIPTION OF ILLUSTRATIVE EMBODIMENTS

Figure 1:
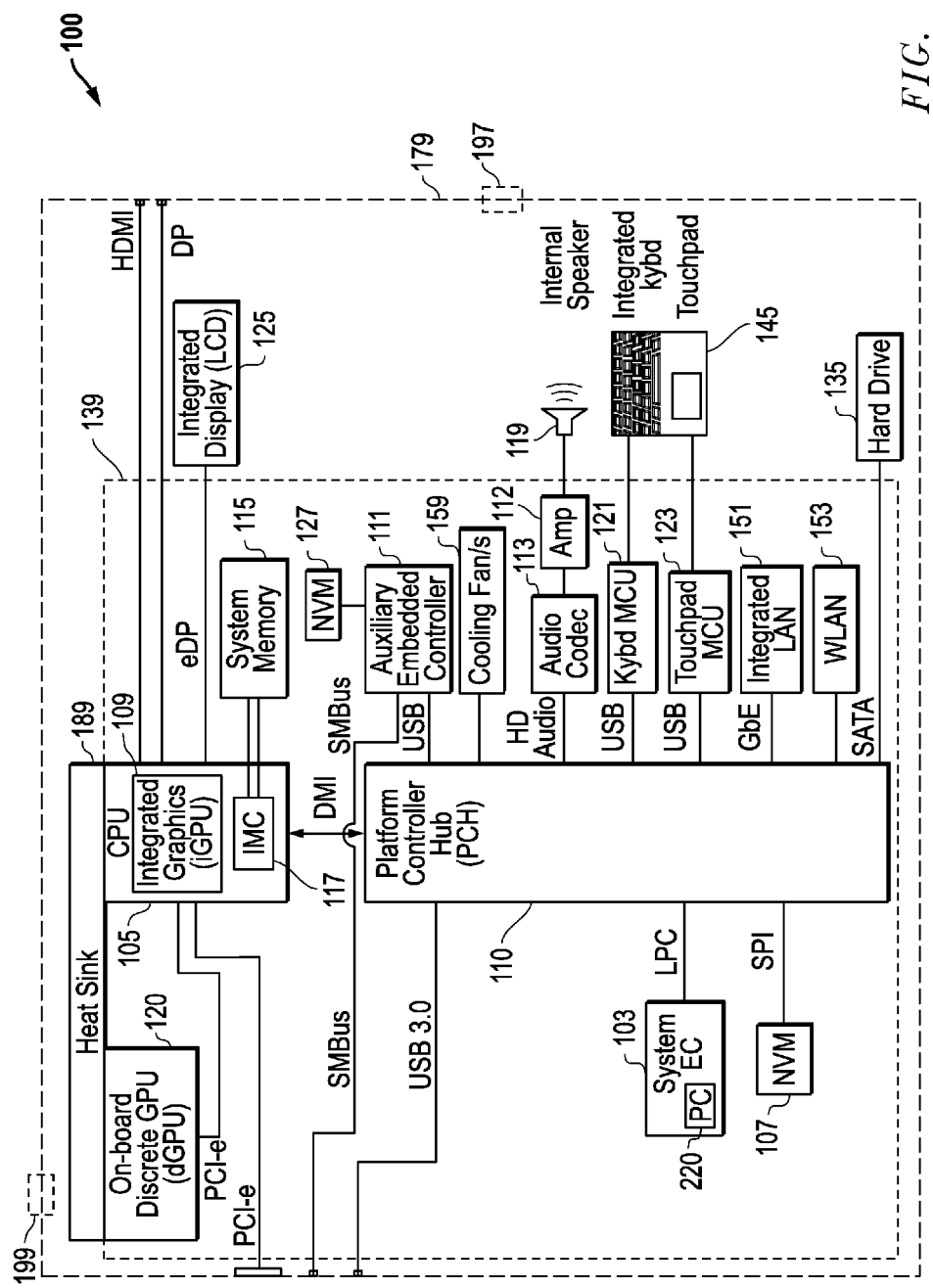
FIG. 1 illustrates a block diagram of an information handling system according to one exemplary embodiment of the disclosed systems and methods.

FIG. 1 is a block diagram of an information handling system 100 coupled to external components according to one exemplary embodiment of the disclosed systems and methods. Information handling system 100 may be, for example, a portable information handling system such as a notebook or laptop computer having a chassis enclosure 179 delineated by the outer dashed outline (e.g., outer notebook plastic and/or metal case that surrounds the notebook computer electrical components with vent openings provided in the case to allow ambient cooling air to be drawn into the chassis enclosure by the cooling fans for dissipating or otherwise transferring heat from a heat sink and its thermally coupled processing device components). However, it will be understood that the disclosed systems and methods may be implemented in other embodiments for other types of information handling systems, such as a desktop computer having a desktop tower or other desktop chassis enclosure configuration, a server having a 1U, 2U, 3U or 4U rack-mount server case enclosure, etc. As shown in FIG. 1, information handling system 100 of this exemplary embodiment includes various components that may be embedded on a system motherboard 139, it being understood that any one or more of such embedded components may be alternatively provided separate from motherboard 139 within chassis case of information handling system 100, e.g., such as provided on a daughter card or other separate mounting configuration.

Still referring to FIG. 1, information handling system may include a host processing device 105 which may be a central processing unit CPU such as an Intel Haswell processor, an Advanced Micro Devices (AMD) Kaveri processor, or one of many other suitable processing devices currently available. In this embodiment, a host processing device in the form of CPU 105 may execute a host operating system (OS) for system 100, as well as software applications such as computer games. System memory may include main system memory 115 (e.g., volatile random access memory such as DRAM or other suitable form of random access memory) coupled (e.g., via DDR channel) to an integrated memory controller (iMC) 117 of CPU 105 to facilitate memory functions, although it will be understood that a memory controller may be alternatively provided as a separate chip or other circuit in other embodiments. Not shown is optional nonvolatile memory (NVM) such as Flash, EEPROM or other suitable non-volatile memory that may also be coupled to CPU 105. CPU 105 itself may also include an integrated GPU (iGPU) 109 as shown.

As shown in FIG. 1, information handling system 100 also includes a separate internal discrete GPU (dGPU) 120 that may be powered by a power source of information handling system (e.g., such as AC adapter and/or internal smart battery pack of a notebook computer) using internal integrated power supply circuitry and/or internal voltage regulation circuitry of information handling system 100. dGPU 120 may be, for example, a PCI-Express (PCI-e) graphics card that is coupled to an internal PCI-e bus of information handling system 100 by multi-lane PCI-e slot and mating connector. dGPU 120 may also be configured to operate in different power modes (e.g., by varying dGPU clock speed), with a relatively higher (e.g., full) dGPU processing power in a non-throttled mode as long as the operating temperature of dGPU 120 is equal to or below a maximum non-throttled operating temperature, and to operate with a relatively lower (e.g., reduced) dGPU processing power when the operating temperature of dGPU 120 is above a maximum non-throttled operating temperature.

In one mode of operation, video content from CPU 105 may be sourced at any given time either by iGPU 109 or dGPU 120, and may be switchable "on the fly" from one to the other using drivers of a switchable graphics software utility (e.g., such as NVidia Optimus available from NVidia of Santa Clara, Calif.; AMD Power Express available from Advanced Micro Devices Inc. of Sunnyvale, Calif.). As further shown, CPU 105 and dGPU 120 are each thermally coupled to a common shared heat sink 189 so as to allow heat transfer (e.g., and in this case mechanically coupled to allow conductive heat transfer) to common shared heat sink 189 which is configured to absorb, dissipate and/or otherwise transfer heat produced by operation of CPU 105 and dGPU 120 to the surrounding cooling air or to other cooling fluid or medium present and/or circulating inside enclosure 179.

In the illustrated embodiment, one or more cooling fan/s 159 may be present to draw cooling air through optional inlet vent opening/s 197 into enclosure 179 and to circulate this cooling air across and in contact with fins of heat sink 189 and then out of enclosure 179 through optional outlet vent opening/s 199. Thus, in this particular exemplary embodiment, shared cooling resources of information handling system 100 include a combination of heat sink 189, cooing fan/s 159 and vents 197 and 199. It will be understood that in other embodiments, different types of shared cooling configurations for CPU 105 and dGPU 120 may be employed, e.g., such as shared liquid heat exchanger for absorbing and dissipating heat from both CPU 105 and dGPU 120 via cooling liquid circulated through hoses or other conduits through enclosure 179. It will also be understood that in one embodiment, the sum of the cooling requirements (e.g., required BTU/hour heat dissipation) of the first processing device and second processing devices when both are operating at maximum processing capacity is greater than the total cooling capacity (e.g., BTU/hour heat absorption or dissipation capability) of the shared cooling resources (heat sink 189, cooing fan/s 159 and vents 197 and 199) of information handling system 100.

In one embodiment, external connectors (e.g., digital HDMI or DVI, analog D-Sub/SVGA, etc.) may be provided for coupling at least one external display (e.g., LCD display or other suitable display device) by external video cabling to receive and display visual images received from dGPU 120 of information handling system 100. As shown, CPU 105 may be provided having multiple (e.g., two) graphics I/O's, although dGPU 120 may be alternatively coupled to CPU 105 by an optional 2:1 PCI-e multiplexer (mux) that is in turn coupled to single graphics input/output (I/O) from iGPU 109 of CPU 105 by an internal PCI-e bus. It will be understood that in one embodiment, system 100 may be optionally configured for coupling to an external graphics dock system and/or one or more additional external displays as described in U.S. patent application Ser. No. 14/523,547 filed Oct. 24, 2014 and entitled "Systems And Methods For Orchestrating External Graphics" by Sierra et. al, which is incorporated herein by reference in its entirety for all purposes.

As further illustrated in FIG. 1, CPU 105 may be coupled to embedded platform controller hub (PCH) 110 which may be present to facilitate input/output functions for the CPU 105 with various internal components of information handling system 100. In this exemplary embodiment, PCH 110 is shown coupled to other embedded components on a motherboard 139 that include system embedded controller 103 (e.g., used for implementing power control logic 220 to detect real time events such as real time operating dGPU temperature provided by an integrated temperature sensor of dGPU 120 across PCH 110, control CPU power consumption by setting CPU power limits across PCH 110, otherwise exchange control and sensed temperature information across PCH 110 with each of dGPU 120 and CPU 105, etc.), non-volatile memory 107 (e.g., storing BIOS, etc.), wireless network card (WLAN) 153 for Wi-Fi or other wireless network communication, integrated network interface card (LAN) 151 for Ethernet or other wired network connection, touchpad microcontroller (MCU) 123, keyboard microcontroller (MCU) 121, audio codec 113, audio amplifier 112, and auxiliary embedded controller 111 which may be implemented by a microcontroller. The tasks and features of an optional auxiliary embedded controller 111 may include, but are not limited to, controlling lighting effects (e.g., keyboard lighting effects) for the chassis of information handling system 100 and/or optional external dock system lighting effects, e.g., in response to user configuration and/or in response to commands from particular applications executing on CPU 105 such as described in U.S. patent application Ser. No. 14/523,547 filed Oct. 24, 2014 and entitled "Systems And Methods For Orchestrating External Graphics" by Siena et. al, which is incorporated herein by reference in its entirety for all purposes.

Also shown coupled to PCH 110 are other non-embedded internal components of information handling system 100 which include integrated display 125 (e.g., LCD display or other suitable integrated portable information handling system display device), internal speaker 119, integrated keyboard and touchpad 145, and local system storage 135 or other suitable type of permanent storage media such as solid state drive (SSD), optical drives, NVRAM, Flash or any other suitable form of internal storage. It will also be understood that persistent storage (e.g., non-volatile memory) may be additionally coupled to PCH 110, system EC 103 and/or auxiliary EC 111 (e.g., NVM 127 as shown). Such persistent storage may store or contain firmware or other programming that may be used by EC 103 and/or EC 111 to implement one or more user-defined system configurations.

In one embodiment, information handling system 100 may be a battery-powered information handling system that is coupled to a source of system (DC) power, for example AC mains and an AC adapter. Information handling system may also include an internal DC power source (e.g., smart battery pack) that is configured to provide system power source for the system load of information handling system, e.g., when an external source of system power is not available or not desirable. Further information on battery-powered information handling system architecture and components may be found in United States Patent Application Publication Number 20140281618A1, which is incorporated herein by reference in its entirety for all purposes. It will also be understood that the particular configuration of FIG. 1 is exemplary only, and that an information handling system may be configured with fewer, additional or alternative components than those illustrated in FIG. 1, e.g., including a network interface card (wired and/or wireless).

Figure 2:
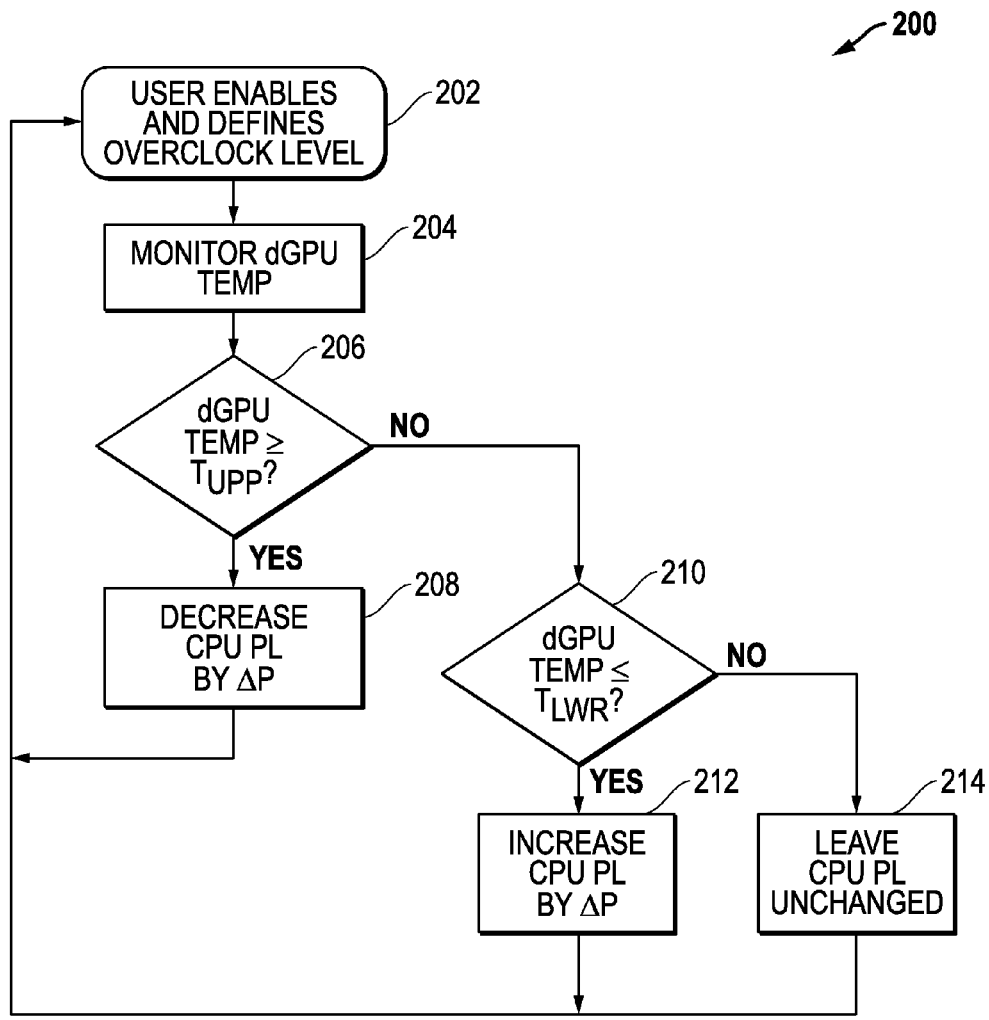
FIG. 2 illustrates a flow chart according to one exemplary embodiment of the disclosed systems and methods.

FIG. 2 illustrates one exemplary embodiment of CPU power consumption control methodology 200 that may be implemented (e.g., in part by power control logic 220 executing on system EC 103 or alternatively other suitable processing device of system 100) as a control loop in which power control logic 220 executing on EC 103 communicates with CPU 105 across PCH 110 to read sensed real time temperature of dGPU 120 across PCH 110 and to control CPU power consumption so as to maintain dGPU operating temperature within a range between selected upper and lower temperature values (between $T_{UPP}$ and $T_{LWR}$) while dGPU 120 is operating at a relatively high utilization level (e.g., such as a dGPU operating temperature of greater than or equal to about 20% of dGPU rated maximum non-throttled temperature). In this regard, methodology 200 may be implemented in one system architecture embodiment having a CPU and dGPU that share common cooling resources to limit CPU power level (and therefore to limit CPU temperature and heat generation) so as to maintain the dGPU operating temperature below the dGPU rated maximum non-throttled operating temperature such that the dGPU continues to operate in a non-throttled condition. It will be understood that in situations where dGPU is not operating (e.g., such as when system 100 is coupled to a docking station having external GPU resources), then methodology 200 of FIG. 2 may either be disabled, or may be allowed to operate and automatically not limit CPU power consumption due to relatively lower sensed temperature of dGPU 120 when dGPU 120 is not operating. In either of the above cases, CPU 105 will be allowed to overclock due to sufficient thermal headroom for CPU overclock that is available from shared heat sink 189 when dGPU 120 is not operating.

Specifically referring to the embodiment of FIG. 1 as an example, methodology 200 may be implemented as a CPU throttling mechanism to limit running average power (and therefore any overclocking) of CPU 105 incrementally until the non-throttled dGPU 120 cools to a temperature range that is greater than a selected amount (e.g., about 10%) below the rated maximum non-throttled temperature of dGPU 120. Methodology 200 may then be implemented to continue to monitor operating temperature of dGPU 120 until a margin of dGPU rated non-throttled maximum temperature exceeds a selected amount (e.g., about 20%) below the rated maximum non-throttled temperature of dGPU 120, at which point methodology 200 may be employed to incrementally increase running average power of CPU 105 incrementally until returning to a higher CPU power consumption level (e.g., such as the originally desired CPU power parameters like PL1). In one embodiment, the feedback loop of methodology 200 may be implemented to run in a tight enough frequency (e.g., in one embodiment about 10 Hz) to avoid allowing operating temperature of dGPU 120 to increase to the dGPU rated non-throttled maximum temperature so as to prevent dGPU 120 from ever hitting or otherwise entering a throttled state while the feedback loop of methodology 200 is running.

In one embodiment, dGPU upper temperature value $T_{UPP}$ may be, for example, temperature value that is selected to be less than the rated maximum non-throttled temperature limit (e.g., turbo-boost limit temperature) specified for dGPU 120 by a manufacturer of dGPU 120, i.e., a temperature threshold at and above which dGPU 120 throttling is initiated. $T_{UPP}$ may be further selected to be sufficiently low enough below the rated maximum non-throttled temperature limit specified for dGPU 120 to allow sufficient headroom for reduction of CPU PL before dGPU reaches the rated maximum non-throttled dGPU temperature limit where throttling is triggered. As an example, $T_{UPP}$ may be selected to be a percentage value (e.g., about 10%) of the operating temperature range below the rated maximum non-throttled temperature limit specified for dGPU 120, where the operating temperature range equals the difference between the dGPU non-throttled temperature limit and the ambient air temperature outside notebook chassis enclosure).

For example, assuming a design ambient air temperature value of 28° C. and a dGPU rated maximum non-throttled temperature limit of 88° C., the operating temperature range is 88° C.−28° C.=60° C. In such a case, $T_{UPP}$ may be selected to be about 10% of the operating temperature range (i.e., 10% of 60° C.=6° C.) below the dGPU rated maximum non-throttled temperature limit of 88° C., or $T_{UPP}$=88° C.−6° C.=82° C. However, it will be understood that $T_{UPP}$ may be selected to be any other greater or lesser temperature value that is less than the rated maximum non-throttled temperature limit specified for dGPU 120, e.g., using a different percentage (greater or less than 10%) of the dGPU operating temperature range, or may be selected by using an entirely different methodology including arbitrary selection of a $T_{UPP}$ value.

Similarly, dGPU lower temperature value $T_{LWR}$ may be selected in any suitable manner, e.g., based on empirical (e.g., laboratory) system testing of the same configuration of CPU, dGPU, cooling fan and heat sink under simulated use conditions; set equal to a system cooling fan initiation temperature, arbitrarily selected, etc. For example, given the above case having design ambient air temperature value of 28° C., dGPU rated maximum non-throttled temperature limit of 88° C. and selected $T_{UPP}$ value of 82° C., $T_{LWR}$ may be selected to be about 64° C., e.g., based on empirical experience that computer games driving the dGPU temperature that high tend to bounce higher in the short term and/or being set equal to the same temperature that cooling fan curves are triggered off of. However, it will be understood that $T_{LWR}$ may be selected to be any other greater or lesser temperature value that is less than the selected $T_{UPP}$ value. In this regard, $T_{LWR}$ may be further selected in one embodiment to be a dGPU operating temperature value that is representative of a lower dGPU utilization at which dGPU 120 may operate in unthrottled condition while CPU 105 operates at its current CPU PL level. It is also noted that a feedback loop that is sufficiently tight enough (e.g., fast enough) may allow selection of a relatively high $T_{LWR}$ value, e.g., for at least some system configurations a feedback loop operating in the 1 Hz range is acceptable for a 64° C. $T_{LWR}$ setting.

As illustrated in FIG. 2, methodology 200 begins in optional step 202 where a user may enable and define CPU over clock (OC) levels in system BIOS executing on CPU 105, e.g., by selecting between pre-defined over clock levels (such as OC Level 1=minimum (lowest) over clock speed, OC Level 2=moderate over clock speed, OC Level 3=maximum (highest) over clock speed). Selection of an OC level may in one embodiment also allow a user to indirectly set the initial value of maximum allowable CPU power limit (PL), with greater OC levels correlating to greater predefined maximum allowable CPU PLs. In one embodiment, a maximum allowable CPU PL may initially correspond to the greater of a predefined CPU sustained PL1 and/or a predefined CPU burst PL2 that corresponds to the selected OC Level). It will also be understood that the methodology of FIG. 2 may be alternatively implemented using CPU manufacturer's default CPU sustained PL1 and/or CPU burst PL2 values instead of PL values based on user-selected OC level of optional step 202. Examples of such manufacturer default PLs that may be set at the manufacturer's factory are PL1=45 Watts and PL2=56.25 Watts, in which case 56.25 Watts would be the initial maximum allowable CPU PL for this embodiment since it is the greater CPU PL value that is initially allowed. In this embodiment, the CPU is allowed to operate in both sustained PL1 power consumption mode and short burst PL2 higher power consumption mode when appropriate, except the CPU power consumption is capped in each mode by the particular CPU PL value that is determined in each iteration of methodology 200.

In yet another alternative embodiment where sufficient information handling system thermal resources (e.g., sufficient heat sink and cooling fan cooling capacity) are provided a user may be allowed to directly select a maximum allowable CPU PL, e.g., by modifying a manufacturer's default CPU sustained PL1 and/or CPU burst PL2 values. In such an alternative embodiment, a maximum allowable CPU PL may then initially correspond to the greater of the directly user-selected CPU sustained PL1 and/or directly user-selected CPU burst PL2. For example, in the above-given default case, a user may change either one of 45 Watt PL1 and/or 56.25 Watt PL2 values to be up to 85 Watts, in which case 85 Watts would be the initial maximum allowable CPU PL for this embodiment since it is the greater CPU PL value that is initially allowed. In this embodiment, the CPU is once again allowed to operate in both sustained PL1 power consumption mode and short burst PL2 higher power consumption mode when appropriate, except the CPU power consumption is capped in each mode by the particular CPU PL value that is determined in each iteration of methodology 200.

In other alternative embodiments, maximum allowable CPU PL may be selected to initially correspond to a sustained PL1 power consumption value (e.g., the manufacturer default PL1 value, directly user-selected CPU sustained PL1, or the predefined CPU sustained PL1 value that corresponds to the selected OC Level), without consideration of PL2 values. For example, where manufacturer default PL1=45 Watts and PL2=56.25 Watts, 45 Watts would be the initial maximum allowable CPU PL such that the CPU is not allowed to operate in the PL2 power consumption mode in this embodiment since it is above the PL1 value that is used as the initial maximum allowable CPU PL value by methodology 200.

In yet another alternative embodiment, methodology 200 may be implemented to apply to and affect the sustained PL1 power consumption mode, without affecting the burst PL2 higher power power consumption mode. In such an embodiment, CPU PL of methodology 200 may be selected to initially correspond to a sustained PL1 power consumption value (e.g., the manufacturer default PL1 value, directly user-selected CPU sustained PL1, or the predefined CPU sustained PL1 value that corresponds to the selected OC Level), and the methodology of FIG. 2 may then be implemented to iteratively modify only the PL1 value (e.g., decrease and increase PL1 in steps 208 or 212, respectively) without changing the manufacturer-set or user-selected PL2 (short time higher power burst power consumption) value that is higher than the sustained PL1 value. In such an alternative embodiment, methodology 200 may be performed using and modifying PL1 as the "CPU PL" variable in steps of methodology 200, and without regard to PL2 which is not controlled by methodology 200 in this alternative embodiment. Therefore, the PL2 power consumption mode remains unmodified in this embodiment with only the PL1 sustained power consumption value being modified by methodology 200, and the CPU may be allowed to exceed the modified PL1 power value up to the PL2 power value regardless of the modified PL1 value for short periods (bursts) of time in this embodiment.

Next, in step 204 dGPU temperature is monitored while CPU 105 and dGPU 120 are executing software application/s such as a computer game. Step 202 is optional since methodology 200 may also be implemented in the case of non-overclocked CPU operating modes, in which case methodology 200 may start with step 204, but otherwise proceed in the same manner as illustrated in FIG. 2. In step 206, the real time monitored temperature of a non-throttled dGPU is compared to the predefined upper temperature value ($T_{UPP}$) to determine if the real time dGPU temperature is greater than or equal to $T_{UPP}$. It will be understood that it is alternatively possible that methodology 200 may be alternatively initiated with dGPU 120 in a throttled (reduced power consumption) operating mode, in which case methodology 200 may be iteratively performed to decrease the dGPU 120 operating temperature to below the dGPU rated maximum non-throttled temperature such that dGPU 120 is no longer operating in a throttled condition.

Still referring to FIG. 2, methodology 200 proceeds to step 208 if it is determined in step 206 that the monitored real time dGPU temperature is greater than or equal to $T_{UPP}$. This higher real time dGPU operating temperature is an indication that dGPU 120 is operating at a relatively higher utilization level (e.g., such as at or near 100% dGPU utilization during game play) and is therefore being worked hard. Thus, methodology 200 proceeds in step 208 to use the control loop of FIG. 2 to keep the real time dGPU operating temperature in an operating range from $T_{UPP}$ to $T_{LWR}$ (e.g., from 79° C. to 88° C. in one exemplary embodiment) while dGPU 120 is operating in such a high utilization mode.

Specifically, in step 208, a current existing maximum allowable CPU power limit (PL) may be decreased by a predefined power value increment ($\Delta P$), and methodology 200 may then return to step 202 and iteratively repeat. The current maximum allowable CPU PL is the power consumption level to which the CPU is currently limited at any given time. In one example embodiment, a maximum allowable CPU PL may be initially set to be the CPU manufacturer's sustained operation power limit "PL1" value and/or to a greater burst operation "PL2" value that is tied to the CPU SKU, although it is possible that other initial CPU PL values may be selected. $\Delta P$ may be selected to be any value that is suitable for incrementally decreasing an existing CPU PL for purposes of throttling CPU clock speed operating temperature such that the operating temperature of dGPU 120 that shares the same cooling resources as CPU 105 is also reduced and does not reach the maximum non-throttled temperature limit where dGPU throttling is initiated. Since methodology 200 is iteratively performed, $\Delta P$ may be selected in one embodiment to be a relatively small value (e.g., about 10%) of the CPU manufacturer's PL1 value (e.g., $\Delta P$ of about 5 Watts for a CPU manufacturer's default PL1 value of 45 Watts). However, any magnitude value of $\Delta P$ may be selected that is desired or otherwise suitable for a given application. In one embodiment, $\Delta P$ may be empirically selected by laboratory testing of the same configuration of CPU, dGPU, cooling fan and heat sink, although this is not necessary.

It will be understood that in one embodiment a minimum allowable CPU PL value setting may be employed to prevent runaway throttling conditions in corner cases. For example, in one exemplary embodiment where a CPU with a manufacturer default 45 Watt PL1 is running all or most of the time at or near a user-selected (e.g., directly user-modified) 85 Watts PL1 power consumption, the disclosed systems and methods may be implemented to decrease the CPU power consumption to as little as 35 Watts PL in iterative steps 208 of FIG. 2 without noticeably impacting system performance. Even further iterative reduction to CPU PL of 25 Watts is also possible in this exemplary embodiment. It will be further understood that in another embodiment a minimum CPU PL value may be set below which CPU PL may not be reduced in step 208, e.g., such as a minimum CPU PL value of 20 Watts in the case of a CPU having a manufacturer's default rated PL1 value of 45 Watts.

In the embodiment of FIG. 2, methodology 200 proceeds to step 210 if it is determined in step 206 that the monitored real time dGPU temperature is not greater than or equal to $T_{UPP}$. In step 210, the real time monitored dGPU temperature is compared to a predefined lower temperature threshold ($T_{LWR}$) to determine if the real time dGPU temperature is less than or equal to $T_{LWR}$. Methodology 200 proceeds to step 212 if it is determined in step 210 that the monitored real time dGPU temperature is less than or equal to $T_{LWR}$. In step 212, a current existing CPU power limit (PL) may be increased by a predefined power increment ($\Delta P$) and methodology 200 may then return to step 202 and iteratively repeat. In one embodiment, $\Delta P$ employed in step 212 may be the same value as $\Delta P$ employed in step 208. However, it is alternatively possible that a first value of $\Delta P_1$ may be used to decrease the CPU PL in step 208, while a second and different value of $\Delta P_2$ may be used to increase the CPU PL in step 212. It will be further understood that in another embodiment a maximum CPU PL value may be set above which CPU PL may not be increased in step 212 according to the particular embodiment of methodology 200 that is being implemented, e.g., such as previously set initial value of maximum allowable CPU PL from step 202, such as user-selected or manufacturer rated CPU PL2 value (e.g., of 56.25 Watts) for the CPU and in an embodiment where the where CPU is allowed to operate in both PL1 and PL2 modes, such as user-selected or manufacturer rated CPU PL1 value (e.g., of 45 Watts) for the CPU and in an embodiment where the CPU is only allowed to operate in PL1 mode, such as any other user-specified PL value, or any other suitable PL value that is compatible with the particular implemented embodiment, etc.

As shown, methodology 200 proceeds to step 214 if it is determined in step 210 that the monitored real time dGPU temperature is not less than $T_{LWR}$. Although greater than or equal to $T_{LWR}$, this relatively lower dGPU operating temperature is an indication that dGPU 120 is operating at a low utilization level (e.g., such as 25% dGPU utilization) and is therefore not working hard. Thus, no CPU PL modification is needed and in step 214 the current CPU PL is left unchanged. Methodology 200 then returns from step 214 to step 202 and iteratively repeats to monitor for increase in dGPU temperature due to increased dGPU utilization.

It will be understood that the methodology of FIG. 2 is exemplary only, and that fewer, additional and/or alternative steps may be performed in any order suitable for controlling CPU power consumption in order to maintain dGPU operating temperature below the dGPU rated maximum non-throttled temperature, i.e., such that the dGPU continues to operate in a non-throttled condition. It will also be understood that although FIGS. 1 and 2 illustrate exemplary embodiments in which a dGPU shares cooling resources with a CPU contained in the same information handling system chassis enclosure, the disclosed systems and methods may be similarly implemented with other types and combinations of two or more processing devices (e.g., such as power regulators, memory, communication devices, secondary CPU's & GPU's, etc.) that share system cooling resources with a CPU or other type of processing device.

It will also be understood that one or more of the tasks, functions, or methodologies described herein (e.g., including those described herein for components 103, 105, 111, 120, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. In one embodiment, such processing devices may be selected from the group consisting of CPU, controller, microcontroller, processor, microprocessor, FPGA, and ASIC. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of controlling processing device power consumption in an information handling system having multiple processing devices, the method comprising:
simultaneously operating at least one first processing device and at least one second processing device of the information handling system while simultaneously cooling the first and second processing devices together using shared cooling resources of the information handling system, and with the first processing device being operated in an overclocked mode at a maximum allowable power limit value and with the second processing device being operated in a non-throttled state;

then using at least one processing device of the information handling system to decrease the maximum allowable power limit value of the first processing device to limit overclocking of the first processing device if a monitored real time operating temperature of the second processing device is greater than or equal to a predefined upper temperature value that is a maximum non-throttled operating temperature for the second processing device; and then operating the first processing device in a non-overclocked mode at the decreased maximum allowable power limit value while continuing to operate the second processing device in a non-throttled condition state at a temperature that is below the maximum non-throttled operating temperature for the second processing device.

2. The method of claim 1, further comprising then using at least one processing device of the information handling system to then increase the maximum allowable power limit value of the first processing device to allow overclocking of the first processing device if a monitored real time operating temperature of the second processing device is less than or equal to a predefined lower temperature value that is lower than the predefined upper temperature value; and then operating the first processing device in an overclocked mode at the increased maximum allowable power limit value while continuing to operate the second processing device in a non-throttled state at a temperature that is below the maximum non-throttled operating temperature for the second processing device.

3. The method of claim 1, further comprising:
(a) simultaneously operating the first processing device and the second processing device of the information handling system within a chassis enclosure of the information handling system while simultaneously cooling the first and second processing devices together using shared cooling resources within the chassis enclosure, and with the first processing device being operated at a first maximum allowable power limit value;
(b) using at least one processing device of the information handling system to monitor the real time operating temperature of the second processing device while operating and cooling the second processing device together with the first processing device while the first processing device is operating at the first maximum allowable power limit value;
(c) then using at least one processing device of the information handling system to decrease the maximum allowable power limit value for the first processing device by a predefined power value increment to a second maximum allowable power limit value that is lower than the first power limit value if the monitored real time operating temperature of the second processing device is greater than or equal to the predefined upper temperature value; and
(d) then simultaneously operating the first processing device and the second processing device while simultaneously cooling the first and second processing devices together using shared cooling resources of the information handling system, and with the first processing device being operated at the second maximum allowable power limit value.

4. The method of claim 3, further comprising:
(e) using at least one processing device of the information handling system to monitor the real time operating temperature of the second processing device while operating and cooling the second processing device together with the first processing device while the first processing device is operating at the second maximum allowable power limit value; and
(f) then using at least one processing device of the information handling system to increase the maximum allowable power limit value for the first processing device by a predefined power value increment to a third maximum allowable power limit value that is greater than the second power limit value if the monitored real time operating temperature of the second processing device is less than or equal to a predefined lower temperature value; and
where the method further comprises empirically determining the predefined lower temperature value by laboratory testing the same system configuration of the information handling system under use conditions.

5. The method of claim 1, further comprising:
(a) simultaneously operating the first processing device and the second processing device of the information handling system within a chassis enclosure of the information handling system while simultaneously cooling the first and second processing devices together using shared cooling resources within the chassis enclosure, and with the first processing device being operated at a current maximum allowable power limit value;
(b) using at least one processing device of the information handling system to monitor the real time operating temperature of the second processing device while operating and cooling the second processing device together with the first processing device while the first processing device is operating at the current maximum allowable power limit value;
(c) then using at least one processing device of the information handling system to perform each of the following steps to determine a new current maximum allowable power limit value that may or may not be the same as the previous maximum allowable power limit value:
decreasing the previous current maximum allowable power limit value for the first processing device by a predefined power value increment to determine a new and different current maximum allowable power limit value that is lower than the previous current power limit value if the monitored real time operating temperature of the second processing device is greater than or equal to the predefined upper temperature value; and
increasing the previous current maximum allowable power limit value for the first processing device by a predefined power value increment to determine a new and different current maximum allowable power limit value that is greater than the previous current power limit value if the monitored real time operating temperature of the second processing device is less than or equal to a predefined lower temperature value; and
leaving the previous current maximum allowable power limit value for the first processing device unchanged to determine a new current maximum allowable power limit that is the same as the previous current maximum allowable power limit if the monitored real time operating temperature of the second processing device is less than the predefined upper temperature value and greater than the predefined lower temperature value; and (d) then iteratively repeating steps (a) through (c).

6. The method of claim 1, further comprising:

alternately operating the first processing device in a sustained (PL1) power consumption mode and a burst (PL2) higher power consumption mode;

using the maximum allowable power limit value to limit power consumption of the first processing device only while the first processing device is operating in the sustained (PL1) power consumption mode; and not using the maximum allowable power limit value to limit power consumption of the first processing device while the first processing device is operating in the burst (PL2) higher power consumption mode.

7. The method of claim 6, where the shared cooling resources of the information handling system comprise:

at least one common heat sink that is thermally and mechanically coupled to each of the first processing device and the second processing device; and at least one cooling fan that circulates air in contact with the heat sink to transfer heat from the heat sink to the circulated cooling air.

8. The method of claim 1, where the first processing device comprises a CPU; where the information handling system further comprises a system embedded controller communicatively coupled to the CPU and to the second processing device; and where the method further comprises:

simultaneously operating the CPU and the at least one second processing device of the information handling system while simultaneously cooling the first and second processing devices together using shared cooling resources of the information handling system, and with the first processing device being operated at a maximum allowable power limit value; and then using the system embedded controller to decrease the maximum allowable power limit value of the CPU if a monitored real time operating temperature of the second processing device is greater than or equal to a predefined upper temperature value.

9. The method of claim 1, further comprising using at least one processing device of the information handling system to allow a user to select an initial value of maximum allowable power limit value before performing the step of using at least one processing device of the information handling system to decrease the maximum allowable power limit value of the first processing device if a monitored real time operating temperature of the second processing device is greater than or equal to a predefined upper temperature value.

10. The method of claim 1, where the information handling system is a notebook computer having a chassis enclosure that surrounds the first processing device, second processing device, and shared cooling resources; where the first processing device is a central processing unit (CPU) and the second processing device is an internal discrete graphics processing unit (GPU); and where the sum of the cooling requirements of the first processing device operating at maximum processing capacity and the second processing device operating at maximum capacity is greater than the cooling capacity of the shared cooling resources of the information handling system.

11. An information handling system, comprising:

at least one first processing device and at least one second processing device, the first processing device being configured to operate in an overclocked mode at a maximum allowable power limit value while the second processing device being operated in a non-throttled state;

shared cooling resources configured to simultaneously cool the first and second processing devices together; and at least one processing device communicatively coupled to the first and second processing devices, and configured to:

monitor real time operating temperature of the second processing device, and decrease the maximum allowable power limit value of the first processing device to limit overclocking of the first processing device if a monitored real time operating temperature of the second processing device is greater than or equal to a predefined upper temperature value that is a maximum non-throttled operating temperature for the second processing device so as to allow the second processing device to continue to operate in a non-throttled condition state and at a temperature that is below the maximum non-throttled operating temperature for the second processing device.

12. The system of claim 11, where at least one processing device of the information handling system is further configured to then increase the maximum allowable power limit value of the first processing device to allow overclocking of the first processing device if a monitored real time operating temperature of the second processing device is less than or equal to a predefined lower temperature value that is lower than the predefined upper temperature value while the second processing device operates in a non-throttled state at a temperature that is below the maximum non-throttled operating temperature for the second processing device.

13. The system of claim 11, further comprising a chassis enclosure that contains the first and second processing devices and the shared cooling resources; and where at least one processing device of the information handling system is further configured to:

(a) monitor the real time operating temperature of the second processing device while the second processing device is operating together with the first processing device operating at a first maximum allowable power limit value, and while the first and second processing devices are being simultaneously cooled together using the shared cooling resources within the chassis enclosure; and (b) then decrease the maximum allowable power limit value for the first processing device by a predefined power value increment to a second maximum allowable power limit value that is lower than the first power limit value if the monitored real time operating temperature of the second processing device is greater than or equal to the predefined upper temperature value such that the first processing device and the second processing device simultaneously operate together while being simultaneously cooled together by the shared cooling resources of the information handling system, and with the first processing device operating at the second maximum allowable power limit value.

14. The system of claim 13, where at least one processing device of the information handling system is further configured to:

(c) monitor the real time operating temperature of the second processing device while the second processing device is being cooled together with the first processing device and while the first processing device is operating at the decreased second maximum allowable power limit value; and (d) then increase the maximum allowable power limit value for the first processing device by a predefined power value increment to a third maximum allowable power limit value that is greater than the second power limit value if the monitored real time operating temperature of the second processing device is less than or equal to a predefined lower temperature value after the maximum allowable power limit value for the first processing device is decreased by a predefined power value increment to a second maximum allowable power limit value;

where the predefined lower temperature value is empirically determined by laboratory testing the same system configuration of the information handling system under use conditions.

15. The system of claim 11, further comprising a chassis enclosure that contains the first and second processing devices and the shared cooling resources; and where at least one processing device of the information handling system is further configured to:

(a) monitor the real time operating temperature of the second processing device while the second processing device is operating together with the first processing device operating at a current maximum allowable power limit value, and while the first and second processing devices are being simultaneously cooled together using the shared cooling resources within the chassis enclosure; and (b) monitor the real time operating temperature of the second processing device while the second processing device is being simultaneously cooled together by the shared cooling resources of the information handling system and while the first processing device is operating at the current maximum allowable power limit value;

(c) then perform each of the following steps to determine a new current maximum allowable power limit value that may or may not be the same as the previous maximum allowable power limit value:

decreasing the previous current maximum allowable power limit value for the first processing device by a predefined power value increment to determine a new and different current maximum allowable power limit value that is lower than the previous current power limit value if the monitored real time operating temperature of the second processing device is greater than or equal to the predefined upper temperature value; and increasing the previous current maximum allowable power limit value for the first processing device by a predefined power value increment to determine a new and different current maximum allowable power limit value that is greater than the previous current power limit value if the monitored real time operating temperature of the second processing device is less than or equal to a predefined lower temperature value; and leaving the previous current maximum allowable power limit value for the first processing device unchanged to determine a new current maximum allowable power limit value that is the same as the previous current maximum allowable power limit if the monitored real time operating temperature of the second processing device is less than the predefined upper temperature value and greater than the predefined lower temperature value; and (d) then iteratively repeating steps (a) through (c).

16. The system of claim 11, where the first processing device is configured to alternately operate in a sustained (PL1) power consumption mode and a burst (PL2) higher power consumption mode; and where the at least one processing device communicatively coupled to the first and second processing devices is configured to:

use the maximum allowable power limit value to limit power consumption of the first processing device only while the first processing device is operating in the sustained (PL1) power consumption mode; and not use the maximum allowable power limit value to limit power consumption of the first processing device while the first processing device is operating in the burst (PL2) higher power consumption mode.

17. The system of claim 16, where the shared cooling resources of the information handling system comprise:

at least one common heat sink that is thermally and mechanically coupled to each of the first processing device and the second processing device; and at least one cooling fan that circulates air in contact with the heat sink to transfer heat from the heat sink to the circulated cooling air.

18. The system of claim 11, where the first processing device comprises a CPU; where the information handling system further comprises a system embedded controller communicatively coupled to the CPU and to the second processing device; and where the embedded controller is further configured to:

simultaneously operating the CPU and the at least one second processing device of the information handling system while simultaneously cooling the first and second processing devices together using shared cooling resources of the information handling system, and with the first processing device being operated at a maximum allowable power limit value; and decrease the maximum allowable power limit value of the CPU if a monitored real time operating temperature of the second processing device is greater than or equal to a predefined upper temperature value while the CPU and the at least one second processing device of the information handling system are simultaneously operating together and being simultaneously cooled together using shared cooling resources of the information handling system while the first processing device is operating at a maximum allowable power limit value.

19. The system of claim 11, where the at least one processing device of the information handling system is configured to allow a user to select an initial value of maximum allowable power limit value before performing the step of decreasing the maximum allowable power limit value of the first processing device if a monitored real time operating temperature of the second processing device is greater than or equal to a predefined upper temperature value.

20. The system of claim 11, where the information handling system is a notebook computer having a chassis enclosure that surrounds the first processing device, second processing device, and shared cooling resources; where the first processing device is a central processing unit (CPU) and the second processing device is an internal discrete graphics processing unit (GPU); and where the sum of the cooling requirements of the first processing device operating at maximum processing capacity and the second processing device operating at maximum capacity is greater than the cooling capacity of the shared cooling resources of the information handling system.

* * * * *